United States Patent
Manning

[15] 3,673,707
[45] July 4, 1972

[54] EDUCATIONAL APPARATUS
[72] Inventor: Virgil B. Manning, 978 Virginia Drive, Brevard County, Fla. 32955
[22] Filed: March 15, 1971
[21] Appl. No.: 124,308

[52] U.S. Cl. ............................... 35/35 D, 35/31 C, 35/9 D
[51] Int. Cl. ....................................................... G09b 1/06
[58] Field of Search ...................... 35/9 C, 31 C, 35 D, 35 H

[56] References Cited

UNITED STATES PATENTS

| | | | |
|---|---|---|---|
| 2,505,230 | 4/1950 | Composto | 35/35 D |
| 2,612,708 | 10/1952 | Amsel | 35/35 D |
| 2,839,843 | 6/1958 | Keyko | 35/35 H |
| 3,015,895 | 1/1962 | Stall | 35/35 D |
| 3,146,534 | 9/1964 | Brown et al. | 35/35 D |
| 3,154,863 | 11/1964 | La Prelle | 35/9 R |
| 3,314,166 | 4/1967 | Styes | 35/9 C |
| 3,520,072 | 7/1970 | Greenwood | 35/35 H |

Primary Examiner—Wm. H. Grieb
Attorney—Duckworth and Hobby

[57] ABSTRACT

A teaching machine apparatus is provided for teaching symbols such as numerals or letters along with their interrelationship, having a flashing light source in a casing. The casing has a segmented front having each segment having a transparent portion to allow the light from the light source to pass therethrough. Means are provided on the casing for attaching coded members over the transparent portions of the casing which coded members have openings located in predetermined locations. A symbol bearing member can be placed over each coded member which member also has a predetermined opening therein. When the correct symbol bearing member is placed over the correct coded member their opening will align, allowing the passage of light therethrough. The unit also provides for a light reflector so that a lamp can be used for a plurality of transparent openings and also for the transparent openings to be covered with transparent colored material for providing different colored flashing lights.

6 Claims, 6 Drawing Figures

PATENTED JUL 4 1972  3,673,707
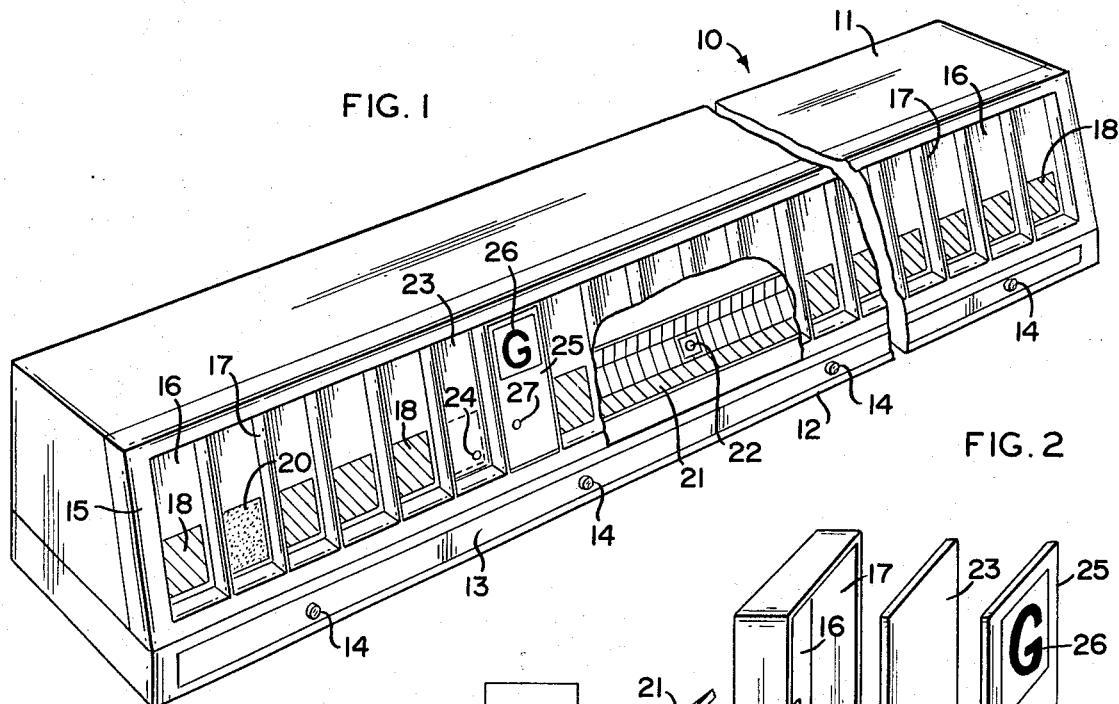
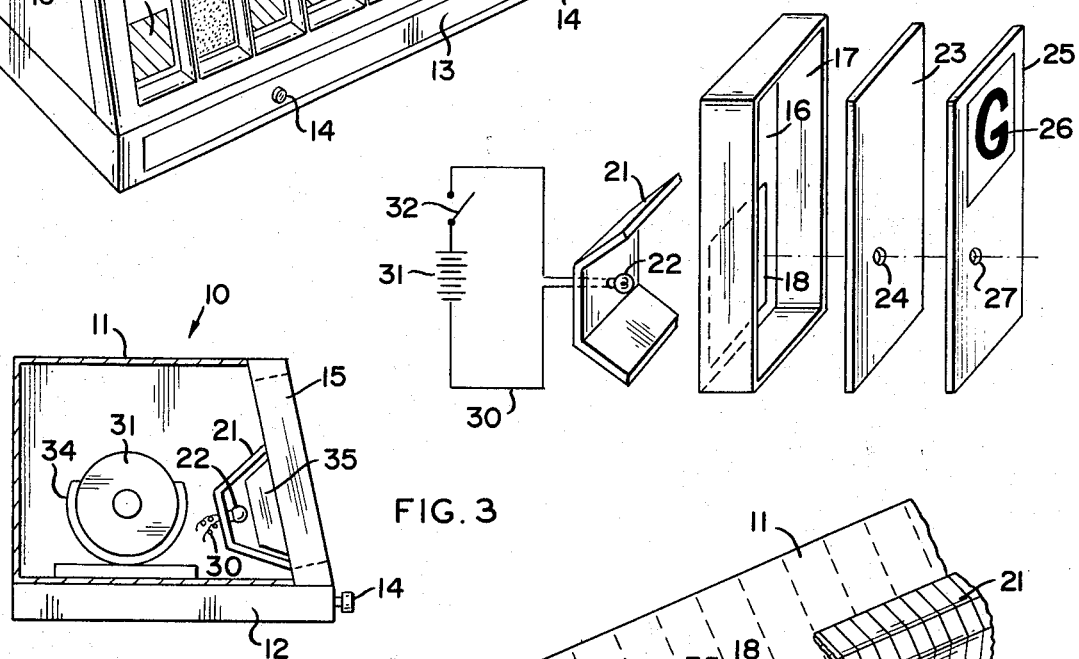
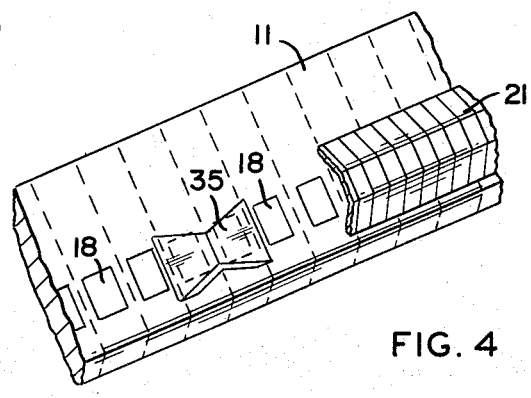
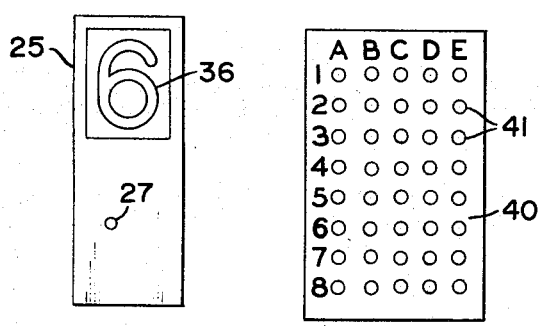
INVENTOR.
VIRGIL B. MANNING
BY Duckworth & Hobby
ATTORNEYS.

3,673,707

EDUCATIONAL APPARATUS

BACKGROUND OF THE INVENTION

The present invention relates to teaching machines and especially to a teaching machine which is simple in operation and economical to build, which machine is adapted to teach letters and numerals and their inter-relation, such as spelling, and simple mathematical operations such as addition and subtraction.

In the past a great variety of educational games and teaching machines have been provided, especially machines adapted to teach numerals and letters as well as spelling. One common type of educational game provides for spelling words using selected coded cards in which a word can be spelled by placing letters thereon and which will allow a peg to enter a slot only when the right letter is being used. This type of game sometimes provides for lighting circuits to tell the player that he has either placed the right letter or the wrong letter in the proper slot. Similar type games also provide pictures of objects to be spelled and require the student to slide cards into the proper slots to spell the words indicated by the picture. One such prior art device is taught in U.S. Pat. No. 3,154,863 which provides a teaching device in which preselected cards are placed on top of each other, one card having an opening to reveal a pre-selected color when the correct answer is selected. Other games of the same general type are shown in U.S. Pat. No. 3,520,072 for a spelling system; U.S. Pat. No. 3,314,166 for an educational device; U.S. Pat. No. 3,015,895 for an education toy; U.S. Pat. No. 3,146,534 for a spelling device in which an illustration is shown and allows for sliding letters into the frame to spell the word indicated by the illustration; and U.S. Pat. No. 2,839,843 for an educational apparatus having coded pegs for alignment in the proper positions to spell words.

SUMMARY OF THE INVENTION

An educational game or teaching machine for teaching symbols, such as numerals or letters, and their inter-relationship, is provided including the teaching of spelling and simple mathematical functions such as addition and subtraction. A casing has a front portion broken down into segments adapted for placement of pairs of coded members. A flashing light source is located inside the housing and has a power source which can be self-contained by utilizing batteries or can be connected to any AC or DC electrical source. The flashing light is adapted to be turned on and off by the operator of the machine and a light is placed in a reflecting tunnel so that it can simultaneously light up a plurality of transparent portions located in segments of the casing. Each transparent portion can be covered with a transparent colored material that produces predetermined colors through the transparent portion. The first coded member placed on a segment covers the transparent portion except for a predetermined opening, and the second coded member has a symbol such as a letter or numeral thereon and also has a predetermined opening so that when the correct symbol bearing member is placed on the matching coded member, the openings will align with each other and provide a flashing light to tell the operator that he has made the right selection. A series of segments can be set up to spell a predetermined word or solve a predetermined equation utilizing the coded members whereby the student can tell by flashing colored lights whether he has correctly spelled a word or solved an equation.

BRIEF DESCRIPTION OF THE DRAWINGS

Other objects, features and advantages of this invention will be apparent from a study of the written description and the drawings in which:

FIG. 1 illustrates a cutaway perspective of one embodiment of the present invention;

FIG. 2 illustrates an exploded view of one section of the embodiment of FIG. 1;

FIG. 3 illustrates a side sectional view of the present invention;

FIG. 4 is a broken-away perspective of a portion of the embodiment of FIG. 1;

FIG. 5 is a plan view of a numeral bearing member; and

FIG. 6 illustrates a potential coding system for use in accordance with the present invention.

DESCRIPTION OF THE PREFERRED EMBODIMENT

Referring now to FIG. 1, a teaching machine 10 is illustrated in perspective having a casing 11, a base portion 12, the base portion 12 having a drawer 13 therein for storing components of the teaching machine, which drawer 13 has knobs 14 for opening the drawer. Casing 11 has a front portion 15 which is divided into a plurality of segments 16 having divisional walls 17. Each segment 16 has a transparent portion 18 therein adapted for light to pass through, and each may be covered with a transparent colored material 20 which could, for instance, be a light transparent plastic which will allow only predetermined colors of light to pass therethrough. Inside the casing 11 can be seen a light reflecting tunnel 21 and a lamp 22 which, as will be described later, may be a flashing lamp to produce a light that is intermittently interrupted to produce a flashing at each transparent window 18. The segment 16 is adapted to slide a flat coded member 23 into, which coded member has an opening 24 therein at a predetermined location, and also is adapted for placing a second coded but symbol bearing member 25 on top of the first coded member 23. The second coded member 25 will have a symbol, such as a letter 26, or a numeral thereon and will have an opening 27 at a predetermined location thereon. The machine can operate by a teacher placing coded members 23 in segments 16 in a predetermined order to spell a word, and the student can take the second coded members 25 with the letters 26 thereon and place them in the proper order over the first coded members 23 in the segments 16. If the student places the right members 25 in the right segments 16 over the correct coded member 23, the holes or openings 24 and 27 will align with each other and provide a flashing light therethrough when the machine is switched on, which light may be colored by the colored plastic 20. Thus, when the student turns the machine on, if all of the letters produce a flashing light the word has been spelled correctly, and if one or more letters does not have a flashing light the word has been misspelled.

FIG. 2 shows an exploded view of one segment of the present invention, in which a segmented portion 16 has walls 17 and is adapted to receive a coded masking member 23 in a predetermined opening 24 therein, and also to receive a symbol member 25 having a letter 26 thereon and a predetermined opening 27 therein. The lamp 22 is seen having a reflecting portion 21 along with a circuit 30 having batteries 31 connected in series therein and a disabling switch 32 connected in series for switching the light on and off. The lamp 22 in this case is a flashlight flasher lamp which may be purchased commercially but any type of flashing unit can be used such as typically used in emergency warning lights or vibrator types such as found in automobiles for flashing turn signals and emergency flashing units.

FIG. 3 shows a section of the teaching machine 10 having a casing 11 with a base 12 and a front portion 15 for insertion of the coded members along with a light tunnel 21 and a lamp 22. Batteries 31 can also be seen in this view connected in the battery holder 34.

FIG. 4 more clearly illustrates the light tunnel 21 interior of the casing 11 having transparent portions 18 and reflectors 35 which can be utilized in the invention to reflect the light down the tunnel 21 to produce a better transmission of the light through the transparent portions 18.

FIG. 5 illustrates a symbol card 25 having a numeral 36 thereon and a coded opening 27 therein for placement in the teaching machine; and FIG. 6 illustrates one coding system layout which would not normally be shown on the card but could be used for setting up a system for use in accordance with the present invention. Thus, a predetermined section 40 would be located on each coding card 23 and each symbol card 25 in the same area, such as the bottom portion of these cards. The letters A, B, C, D and E across the top indicate one group of vertical lines and the numbers 1, 2, 3, 4, 5, 6, 7 and 8, indicate the horizontal lines, with the crossing points of the lines indicating the location of the coded holes or opening in each coded member. Each opening could be given a code for a particular symbol: for instance hole C–3, illustrated at 41 could be the letter A. The inventor does not intend to be limited to any particular code, but the following is one code that has been operated satisfactorily in connection with the present invention in FIG. 6:

| | | |
|---|---|---|
| A = C3 | N = E8 | *0 = A3 |
| B = D6 | *0 = A3 | 1 = B5 |
| C = E3 | P = D7 | 2 = D4 |
| D = B7 | Q = E6 | 3 = C8 |
| E = C5 | R = A2 | 4 = C4 |
| F = E2 | S = D8 | 5 = E7 |
| G = B3 | T = A4 | 6 = D5 |
| H = B6 | U = C7 | 7 = B4 |
| I = D3 | V = D2 | 8 = A5 |
| J = C6 | W = A6 | 9 = A7 |
| K = B2 | X = E4 | |
| L = A8 | Y = B8 | |
| M = E5 | Z = C2 | |

"0" in Alphabet and "0" in numbers has the same code; and holes A1, B1, C1, D1, and E1 are not used in this model but could be put to use for other information for teaching other things.

It should be clear at this point that a teaching machine or educational game has been provided which is simple in operation and economical to build and thus may be adapted for use in the home where the parents can work with the students but which could also be well suited for use in schools.

One preferred embodiment of this invention has been illustrated, but this invention is not to be construed as limited to the particular forms disclosed herein, since these are to be regarded as illustrative rather than restrictive.

I claim:

1. An educational game apparatus for teaching symbols such as numerals or letters and their inter-relationship comprising in combination:
   a. a casing;
   b. a light source located in said casing and being connected to a power source, said light source having flashing means for flashing said light source;
   c. said casing having a plurality of segments on the exterior thereof for attaching a plurality of coded members thereto, each segment having a transparent portion adapted to transmit light from said light source therethrough;
   d. a plurality of first coded members for blocking out said transparent portions of said casing when placed thereover except for predetermined opening in each said coded member; and
   e. a plurality of second coded members having symbols thereon and predetermined openings therein, each said second coded member having a matching first coded member whereby when the coded member is placed over the matching first coded member their openings will align allowing light passing through said transparent portion to pass through said first and second coded members to produce a flashing light therethrough.

2. The apparatus according to claim 1 in which said power source is batteries.

3. The apparatus according to claim 2 in which each said transparent portion of each segment is covered with a transparent colored material whereby only predetermined colors of light will pass through said transparent portion of said segments of said casing.

4. The apparatus according to claim 3 in which said light source has reflectors associated therewith for directing said light through a plurality of said transparent portions of said casing.

5. The apparatus according to claim 4 in which said casing includes a drawer for storage of said coded members.

6. The apparatus according to claim 5 in which a plurality of light sources is used.

* * * * *